| United States Patent [19] | [11] Patent Number: 4,814,103 |
|---|---|
| Potter et al. | [45] Date of Patent: Mar. 21, 1989 |

[54] COLOR STABLE URETHANE PREPOLYMER

[75] Inventors: Terry A. Potter; Richard S. Pantone; Russell P. Carter, Jr., all of New Martinsville, W. Va.

[73] Assignee: Mobay Corporation, Pittsburgh, Pa.

[21] Appl. No.: 157,771

[22] Filed: Feb. 18, 1988

[51] Int. Cl.$^4$ .............................. C09K 3/00; C08K 5/15
[52] U.S. Cl. ................................ 252/182.22; 524/101; 524/109; 524/114; 528/48; 528/53
[58] Field of Search ................. 252/406, 407, 182; 528/48, 53; 524/109, 114, 101; 560/331, 333; 523/415, 456

[56] References Cited

U.S. PATENT DOCUMENTS

| 2,885,420 | 5/1959 | Spiegler | 528/48 |
|---|---|---|---|
| 2,915,496 | 12/1959 | Swart | 528/48 |
| 2,950,307 | 8/1960 | France et al. | 560/333 |
| 3,226,411 | 12/1965 | Smith | 560/333 |
| 3,707,527 | 12/1972 | Budnowski et al. | 528/53 |
| 3,715,381 | 2/1973 | Spaunburgh et al. | 560/333 |
| 3,828,005 | 8/1974 | Pittman | 523/456 |
| 4,064,157 | 12/1977 | Nafziger et al. | 560/333 |
| 4,076,764 | 2/1978 | Bauer | 523/456 |
| 4,677,154 | 6/1987 | Narayan et al. | 560/331 |

FOREIGN PATENT DOCUMENTS 1465014 2/1977 United Kingdom .

Primary Examiner—Veronica P. Hoke
Attorney, Agent, or Firm—Harsh, Gene; Joseph C. Gil; Aron Preis

[57] ABSTRACT

The present invention is directed to the stabilization of a prepolymer based on methylene diphenyl isocyanate rich in the 2,4'-isomer. It was surprisingly found that the color stability, viscosity and aging characteristics of the prepolymer are improved markedly upon the incorporation therewith of a combination of a certain epoxide compound and a hindered phenol.

9 Claims, No Drawings

COLOR STABLE URETHANE PREPOLYMER

FIELD OF THE INVENTION

The present invention is directed to color stable prepolymers and more particularly to prepolymers of methylene diphenyl isocyanate (MDI).

SUMMARY OF THE INVENTION

It has long been recognized that certain perpolymers discolor or darken during storage. Prepolymers which are based on methylene diphenyl isocyanate isomer mixtures which contain a high concentration of the 2,4'-isomer (hereinafter 2,4'-rich MDI) are among the ones thus effected. The present invention resides in the findings that the discoloration or darkening of prepolymer based on 2,4'-rich MDI is substantially prevented upon the addition of a stabilizer thereto. In the present context the stabilizer is a combination of (i) a compound containing an epoxy functionality and (ii) a hindered phenol. Light colored, stable prepolymers which do not discolor upon storage even at elevated temperatures were produced in accordance with the invention. The isocyanate content and the viscosity of the prepolymers were not significantly affected by the added stabilizer.

BACKGROUND OF THE INVENTION

Freshly distilled methylene diphenyl diisocyanate isomer mixture which contain a high concentration of the 2,4'-isomer (2,4'-rich MDI) and prepolymers based thereon are generally colorless. These materials undergo significant discoloration upon storage even in the absence of light. They tend to yellow and occasionally turn brown. While discolored 2,4'-rich MDI can be distilled to prepare a colorless product that is only a temporary measure. The discolored prepolymers can not be distilled to prepare a colorless mixture.

The stabilizer of the invention appears to have a synergistic effect in maintaining the color of prepolymers based on 2,4'-rich MDI. The prior art as represented by U.S. Pat. No. 2,885,420 disclosed color improvement of monomeric isocyanates resulting upon the addition of ethers or thioethers including phenyl glycidyl ether. The aging conditions however demonstrated in the reference were relatively mild (storage at room temperature for 100 hours at 20% relative humidity). In prepolymers based on 2,4'-rich MDI the addition of an epoxide alone is not effective as a stabilizer upon aging at higher temperatures and at longer aging times.

DETAILED DESCRIPTION OF THE INVENTION

In the practice of the present invention a stabilizing combination of (i) an epoxy functional compound and (ii) a hindered phenol is added to a prepolymer derived from a mixture of methylene diphenyl diisocyanate (MDI) isomer which contain a high concentration of the 2,4'-isomer (2,4'-rich MDI). Both the monomeric form of the diisocyanate of the invention and the prepolymers based thereon are well known in the art. In the present context 2,4'-rich MDI is a mixture comprising 20–90% of 4,4'-isomer, 10–70% of 2,4'-isomer and 0–10% of 2,2'-isomer.

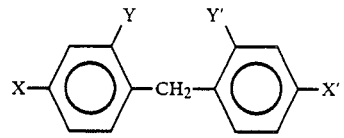

The 4,4'-isomer is characterized in that $X=X'=NCO$ and $Y=Y'=H$. In 2,4'-isomer, $X=Y'=NCO$ and $Y=X'=H$ in the 2,2'-isomer $Y=Y'=NCO$ and $X=X'=H$.

The prepolymer is prepared by reacting 2,4'-rich MDI with a compound which contains an isocyanate-reactive group, preferably a hydroxyl group. These compounds generally have an average functionality of about 2 to 8, preferably 2 to 4 and contain at least two isocyanate-reactive hydrogen atoms. Generally their molecular weight is 400 to about 10,000, preferably 400 to about 8,000.

Examples include:

(1) polyhydroxyl polyesters which are obtained from polyhydric, preferably dihydric alcohols to which trihydric alcohols may be added, and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be saturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate.

(2) Polylactones generally known from polyurethane chemistry, e.g., polymers of caprolactone initiated with polyhydric alcohols.

(3) Polycarbonates containing hydroxyl groups such as the products obtained from reaction of polyhydric alcohols, preferably dihydric alcohols such as 1,3-propanediol, 1,4-butanediol, 1,4-dimethylol cyclohexane, 1,6-hexanediol, diethylene glycol, triethylene glycol or tetraethylene glycol with phosgene, diaryl carbonates such as diphenyl carbonate or cyclic carbonates such as ethylene or propylene carbonate. Also suitable are polyester carbonates obtained from the reaction of lower molecular weight oligomers of polyesters or polylactones with phosgene, diaryl carbonates or cyclic carbonates.

(4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Suitable starting compounds containing at least one reactive hydrogen atom include polyols and, in addition, water, methanol, ethanol, 1,2,6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Polyethers modified by vinyl polymers are also suitable for the preparation of the prepolymer of the invention. Products of this kind may be obtained by polymerizing, e.g., styrene and acrylonitrile in the presence of polyethers (U.S. Pat. Nos. 3,383,351; 3,304,273; 3,523,095; and 3,110,695; and German Pat. No. 1,152,526). Also suitable as polyethers are amino polyethers wherein at least a portion of the hydroxyl groups of the previously described polyethers are converted to amino groups.

(5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

(6) Polyacetals including those obtained from the above-mentioned polyhydric alcohols, especially diethylene glycol, triethylene glycol, 4,4'-dioxyethoxydiphenyldimethylene, 1,6-hexanediol and formaldehyde. Suitable polyacetals may also be prepared by the polymerization of cyclic acetals.

(7) Polyether ester containing isocyanate-reactive groups which are known in the art.

(8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

(9) Polyacrylates including those based on acrylic acid, methacrylic acid and crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidylacrylate, glycidyl methacrylate, 2-isocyanatoethyl acrylate and 2-isocyanatoethyl methacrylate.

The preferred isocyanate-reactive compounds for use in the process according to the invention are the polyhydroxyl polyethers, polyesters, polylactones, polycarbonates and polyester carbonates.

Also suitable are low molecular weight isocyanate-reactive compounds having an average molecular weight of up to 400. The low molecular weight isocyanate-reactive compounds should have an average functionality of about 2 to 8, preferably from about 2 to 6 and most preferably from about 2 to 4, and may also contain ether, thioether, ester, urethane and/or urea bonds.

Examples of low molecular weight compounds include the polyamines and diols or triols used as chain lengthening agents or cross-linking agents in polyurethane chemistry. Examples include those set forth in U.S. Pat. Nos. 4,439,593 and 4,518,522, both of which are incorporated herein by reference in their entirety.

The prepolymer of the invention is further characterized in that its isocyanate content is preferably 3–30 percent, most preferably 50–25% by weight.

Any chemical compound which contains the epoxide (oxirane) functionality is suitable in the preparation of the stabilizing combination of the invention. The epoxide equivalent weight range should be about 44 to 400. Specifically preferred epoxide compounds are aliphatic and cycloaliphatic epoxides, optionally containing ether or ester groups such as triglycidyl pentaerythritol, tetraglycidyl pentaerythritol, epoxidized fats or oils such as epoxidized linseed oil or epoxidized soya bean oil and cycloaliphatic diepoxide products such as dicyclopentadiene dioxide or compounds conforming to

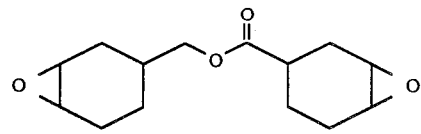

such as ERL 4221, a product of Union Carbide. Also useful are epoxides which contain other organic moieties such as triglycidyl isocyanurate. Also suitable, but less preferred are glycidyl ethers of bisphenol A,

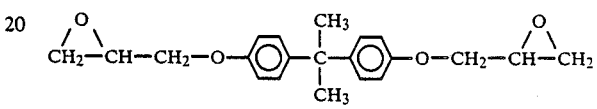

such as EPON 828, a product of Shell Inc.

The hindered phenols suitable in the context of the present invention conform structurally to

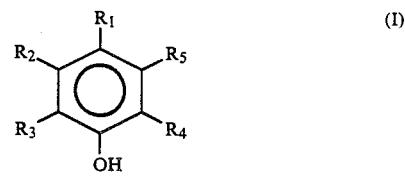

wherein $R_1$, $R_2$ and $R_5$ independently are a hydrogen atom or an alkyl group, $R_3$ and $R_4$ independently are alkyl groups preferably an alkyl group containing at least 3 carbon atoms, more preferably $C_3$-$C_{10}$ alkyl radical and most preferably, tertiary butyl radical.

The preferred compounds include

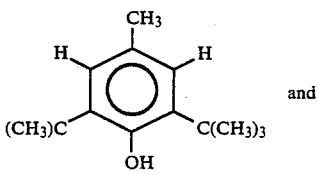

(II)
Butylated hydroxy toluene
(BHT)

and

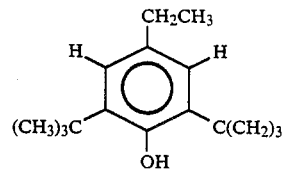

(III)
Butylate hydroxy ethyl benzene
(BHEB)

In stabilizing the prepolymers in accordance with the invention the amounts of the components of the stabilizing combination are: about 0.05% to about 1% of the epoxide compound and about 0.04% to about 0.5% of the hindered phenol. The corresponding preferred amounts are about 0.1% to about 0.5% of the epoxide compound and about 0.04% to about 0.25% of the hindered phenol.

In carrying out the practice of the invention, it is necessary to add the hindered phenol directly to the 2,4'-rich MDI immediately after distillation. The epoxide may be added then or later along with the other co-reactants when the prepolymer is made.

In demonstrating the invention prepolymers based on 2,4'-rich MDI were prepared and their properties' dependence on the stabilizer incorporated therewith were measured. The prepolymers were based on a 2,4'-rich MDI containing 29% 2,4'-isomer, 70% 4,4'-isomer and 1% 2,2'-isomer. To 778.8 grams of the mixture, at 35° C. was added the stabilizing addition or combination of additives as noted in Table 1. 116 grams of tripropylene glycol (TPG) were then added to each sample and the mixture heated to 70° C. and maintained at this temperature for two hours. The theoretical NCO content is 23.5%. Samples were stored in a 50° C. oven and their properties—Gardner Color per ASTM 1544, NCO content and viscosity at 25° C.—after the preparation of the sample and after aging for 1, 3 and 5 weeks were determined.

Example 1—control—contained no additives

Highly colored (Gardner No. 4) product was already observed during the preparation of the prepolymer and the discoloration progressed further during the 5 week aging period (Gardner No. 6). In Examples 2 and 3 containing the hindered phenols BHT and BHEB respectively, no improvement was obtained in comparison to the control. Example 4 containing the epoxide ERL 4221 also yields a prepolymer with pool color stability. Example 5 demonstrates the invention; good color (Gardner No. less than 1) was maintained even after aging for 5 weeks.

TABLE I

| Example[2] | Additive | Gardner Color[1] | | | | % NCO[1] | | | Viscosity[1], mPa.s @ 25° C. | | | |
|---|---|---|---|---|---|---|---|---|---|---|---|---|
| | | 0 | 1 | 3 | 5 | 0 | 3 | 5 | 0 | 1 | 3 | 5 |
| 1 | None | 4 | 6 | 6 | 6 | 23.5 | 23.3 | 23.0 | 476 | 522 | 572 | 612 |
| 2 | 0.1% BHT | 4 | 6 | 6 | 6 | 23.4 | 23.3 | 23.0 | 490 | 534 | 612 | 654 |
| 3 | 0.1% BHEB | 4 | 6 | 6 | 6 | 23.5 | 23.1 | 22.9 | 480 | 530 | 620 | 666 |
| 4 | 0.1% ERL 4221 | >1 | 3 | 4 | 5 | 23.5 | — | — | 480 | — | — | — |
| 5 | 0.1% BHT & 0.5%-ERL 4221 | <1 | <1 | <1 | <1 | 23.1 | 23.0 | 22.7 | 490 | 550 | 654 | 740 |

[1]The Gardner Color, in accordance with ASTM Method 1544 was determined after aging at 50° C. for the designated number of weeks. Also determined after aging for the indicated number of weeks were the % NCO content and the viscosities.
[2]The compositional make-up of the Examples is given in the text.

Additional experiments comparing the stabilizer of the invention to other additives were carried out and the results are presented in Table 2 below. Samples were prepared and stored in 50° C. oven and their properties: Gardner color, NCO content and viscosity at 25° C. after the preparation of the sample and after aging for two weeks were determined.

TABLE 2

| Example | Additive | Gardner Color[1] | | | NCO[1] | | Viscosity[1], mPa.s @ 25° C. | |
|---|---|---|---|---|---|---|---|---|
| | | 0 | 1 | 2 | 0 | 2 | 0 | 2 |
| 6 | 0.1% BHT | 5 | 7 | 7 | 23.7 | 23.6 | 540 | 608 |
| 7 | 0.1% BHT, 0.5% ERL 4221 | <1 | <1 | <1 | 23.4 | 23.3 | 520 | 618 |
| 8 | 0.1% BHT, 0.25% ERL 4221 | <1 | <1 | <1 | 23.5 | 23.2 | 540 | 612 |
| 9 | 0.1% BHT, 0.6% ELO[4] | <1 | 3 | 3 | 23.5 | 23.2 | 530 | 594 |
| 10 | 0.1% BHT, 0.3% ELO | <1 | 4 | 4 | 23.4 | 23.2 | 544 | 624 |
| 11 | 0.1% BHT, 0.7% EPON 828 | <1 | 1 | 1 | 23.5 | 17.3 | 540 | S[3] |
| 12 | 0.1% BHT, 0.35% EPON 828 | 2 | 2 | 2 | 23.4 | 17.6 | 520 | S[3] |
| 13 | 0.04% BHT, 0.5% ERL 4221 | 1 | 1 | 1 | 23.5 | 22.9 | 522 | 694 |

[1]The Gardner Color, in accordance with ASTM 1544 was determined after aging for the designated number of weeks. Also determined after aging for the indicated number of weeks were the % NCO content and the viscosities.
[2]The prepolymers were based on a 2,4'-rich MDI mixture and tripropylene glycol.
[3]Solid at room temperature.
[4]Epoxidized linseed oil.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A prepolymer based on a methylene diphenyl isocyanate mixture which is rich in the 2,4'-isomer comprising a color stabilizing amount of a cycloaliphatic epoxide compound and a hindered phenol said mixture containing about 20-90 wt. % of the 4,4'-isomer, 10-70 wt. % of the 2,4'-isomer and 0-10 wt. % of the 2,2'-isomer said prepolymer being the product of reacting said mixture with a compound which contains an isocyanate reactive group.

2. The prepolymer of claim 1 wherein said epoxide compound has an epoxide equivalent weight of about 44 to 400.

3. The prepolymer of claim 1 wherein said hindered phenol is present at an amount of 0.04 to about 0.5% and wherein said epoxide compound is present at an amount of 0.05 to about 1% based on the weight of said isocyanate or prepolymer.

4. A process for stabilizing a methylene diphenyl isocyanate based prepolymer comprising (i) adding to a mixture of methylene diphenyl isocyanates about 0.04 to 0.5 wt. % of a hindered phenol and (ii) adding about 0.05 to 1 wt. % of a cycloaliphatic epoxide compound to said mixture wherein said mixture contains 20-90 wt. % of the 4,4'-isomer, 10-70 wt. % of the 2,4'-isomer and 0-10 wt. % of the 2,2'-isomer said prepolymer being the product of reacting said mixture with a compound which contains an isocyanate reactive group.

5. The process of claim 4 wherein said hindered phenol conforms to

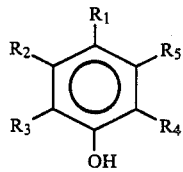

wherein $R_1$, $R_2$ and $R_5$ are hydrogen atoms or an alkyl group and $R_3$ and $R_4$ are alkyl groups having at least three carbon atoms.

6. The process of claim 4 wherein said hindered phenol conforms to

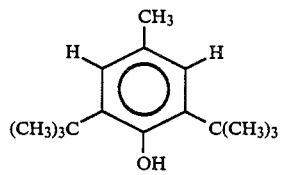

or

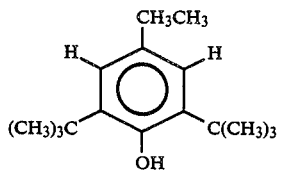

7. The process of claim 4 wherein said epoxide compound has an epoxide equivalent weight of about 44 to 400.

8. A prepolymer based on methylene diphenyl isocyanate mixture which is rich in the 2,4'-isomer comprising a color stabilizing amount of a cycloaliphatic epoxide compound conforming to

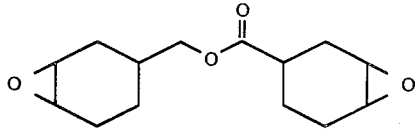

and a hindered phenol said mixture containing about 20-90 wt. % of the 4,4'-isomer, 10-70 wt. % of the 2,4'-isomer and 0-10 wt. % of the 2,2'-isomer said prepolymer being the product of reacting said mixture with a compound whuich contains an isocyanate reactive group.

9. A process for stabilizing a methylene diphenyl isocyanate based prepolymer comprising (i) adding to a mixture of methylene diphenyl isocyanate about 0.04 to 0.5 wt. % of a hindered phenol and (ii) adding about 0.05 to 1 wt. % of a cycloaliphatic epoxide compound conforming to

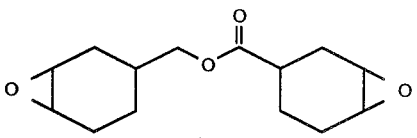

wherein said mixture contains 20-90 wt. % of the 4,4'-isomer, 10-70 wt. % of the 2,4'-isomer and 0-10 wt. % of the 2,2'-isomer said prepolymer being the product of reacting said mixture with a compound which contains an isocyanate reactive group.

* * * * *